F. E. SUTHERLAND & J. A. BROWN.
CLUTCH MECHANISM.
APPLICATION FILED NOV. 9, 1909.
986,324.
Patented Mar. 7, 1911.
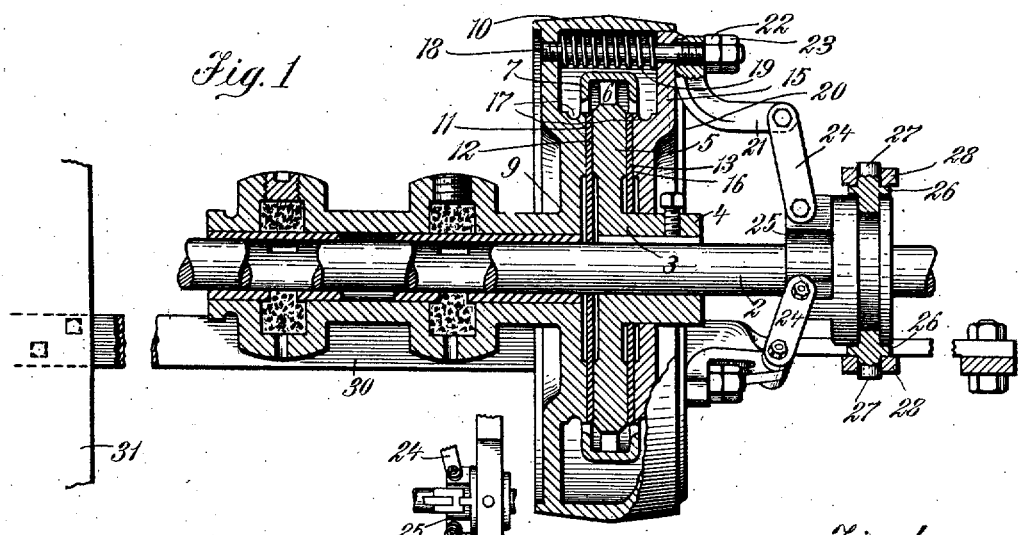
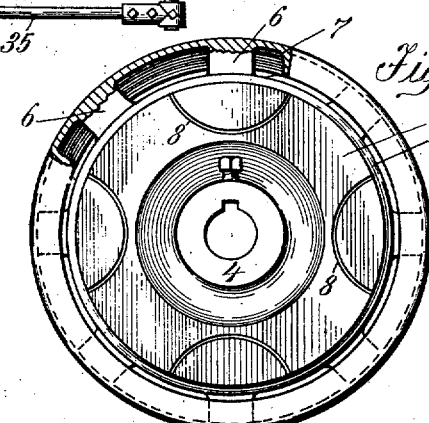
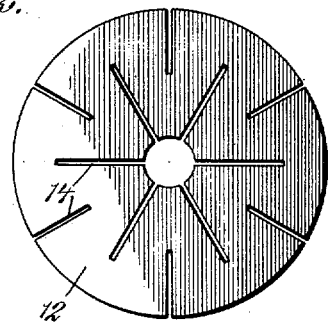
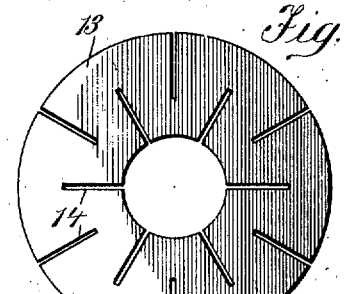
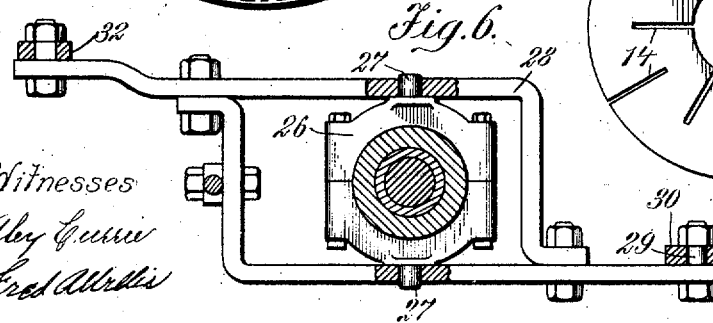
Witnesses
Aby Currie
Fred A Willis
Inventors
Fred E. Sutherland
James A. Brown
by
Attorney

UNITED STATES PATENT OFFICE.

FRED E. SUTHERLAND AND JAMES A. BROWN, OF LOS ANGELES, CALIFORNIA, ASSIGNORS TO THE RADIAL POWER HAMMER COMPANY, OF LOS ANGELES, CALIFORNIA, A CORPORATION OF CALIFORNIA.

CLUTCH MECHANISM.

986,324.  Specification of Letters Patent.  Patented Mar. 7, 1911.

Original application filed May 27, 1909, Serial No. 498,765. Divided and this application filed November 9, 1909. Serial No. 527,086.

*To all whom it may concern:*

Be it known that we, FRED E. SUTHERLAND and JAMES A. BROWN, citizens of the United States of America, residing at Los Angeles, in the county of Los Angeles, State of California, have invented a certain new and useful Clutch Mechanism; and we do hereby declare the following to be a full, clear, and exact description of the invention, such as will enable others skilled in the art to which it appertains to make and use the same.

This application is a division of our application Serial No. 498,765, filed May 27, 1909.

The invention relates to clutch mechanism, and consists in certain novel features of construction and combination of parts hereinafter described and claimed.

Objects of the invention are to provide a clutch mechanism which shall be simple and economical to construct, sensitive in control, durable and efficient in use, and in which oil is effectively distributed to the frictional surfaces.

Other objects and the advantages of the invention will be apparent to those skilled in the art from a consideration of the following description of one form of construction in which the invention may be embodied, taken in connection with the accompanying drawings, in which—

Figure 1 is a central section through the clutch mechanism; Fig. 2 shows a portion of the clutch operating mechanism; Fig. 3 is an end elevation of the driven member of the clutch; Figs. 4 and 5 are elevations of the clutch disks; Fig. 6 is an elevation, with parts in section, of the clutch shifter.

Referring to the drawings, on main shaft 2 may be rigidly mounted the driven member 3 of the clutch, having a hub 4 and a flange 5 at the periphery of which are a plurality of pieces 6 connecting the flange 5 with an annular conduit or trough 7, designed to catch and return the oil to the working faces of the clutch. Each face of the flange 5 is provided with a plurality of oil grooves 8, with openings near to the periphery of the flange.

The driving member of the clutch may comprise a casing 9 loosely mounted on shaft 2. The outer portion of casing 9 preferably constitutes the main driving pulley 10 of the machine, and has therein a face 11. A disk 12 of fiber or other suitable material is placed on shaft 2 next to face 11 and next to said disk is placed the driven member 3. A second disk 13 similar to disk 12, except that the hole in its center is of a size to fit over hub 4, is placed against the face of flange 5 on the side next to hub 4. Both disks 12 and 13 are provided with substantially radial slits or passages 14, a part of which preferably extend part way toward the circumference from the central opening in the disks and the remainder of which are intermediate of these and extend from the circumference toward the central opening. As shown, the outer ends of the slits or passages 14 extending toward the circumference are beyond the inner ends of those extending from the circumference.

The grooves 8 in the faces of flange 5 have their openings near the periphery of the flange and may preferably be of the form shown in Fig. 3, that is to say, the grooves lead from and return to the periphery of the flange. Oil in the trough 7, when relative movement takes place between the frictional surfaces of the clutch, may pass to said surfaces by way of the grooves 8 and passages 14 and surplus oil may return to the trough by way of the passages and grooves. As will be understood the passages 14 aid in the uniform distribution of the oil over the surfaces.

From the foregoing description and by viewing Fig. 1 it will be apparent that when the clutch mechanism is disengaged oil may readily find its way from conduit 7 to the faces of the disks 12 and 13 and the rubbing surfaces of the other parts. Ample lubrication is thus insured. The slits or passages 14 which extend inwardly from the circumference of the disks also prevent any buckling of the disks.

A plate 15 may fit closely in the open end of casing 9 and have a face 16 opposite disk 13. Contiguous to faces 11 and 16 are oil shedding grooves 17 which catch oil and return it to conduit 7. Studs 18 pass freely through plate 15 and are secured to casing 9. On studs 18 are springs 19 interposed between plate 15 and the point of attachment of the studs to casing 9. These springs serve to normally keep the frictional surfaces disengaged. Near the periphery of the plate 15 may be an annular rim 20 with which may contact the ends of levers 21 loosely mounted on studs 18. The ends of studs 18 projecting beyond levers 21 receive nuts 22 and lock nuts 23. The end of each lever 21 remote from studs 18 is jointedly connected to one end of toggle links 24, the other end of said toggle links being jointedly connected to a collar 25 slidable on shaft 2. When collar 25 is moved toward plate 15, the plate 15 is pressed into casing 9 and the faces 11 and 16 moved toward each other, pressing the disks 12 and 13 against the faces of flange 5, thus engaging the clutch.

On collar 25 is freely mounted a yoke 26 having trunnions 27 pivotally engaged by a shifter 28. One end of shifter 28 is held stationary by a pivot 29 affixed to bar 30, attached to the stationary part 31. The movable end of shifter 28 may be attached to a rod 32 connected to pedal lever 33 mounted on pedal shaft 34, to which may be attached a pedal 35.

Rod 32 is slidably mounted at its forward end in a stationary part 36, and has a spring 37 which, reacting between the frame and a collar on the rod, normally presses the latter to a position to disengage the clutch.

While one form of apparatus in which the invention may be embodied has been illustrated and described, it is obvious that various modifications and changes may be made, and the right is reserved to all such modifications and changes as do not depart from the spirit and scope of the invention.

We claim:

1. In a clutch, the combination of a driving member with a driven member, including a flange having oil grooves therein, said oil grooves having openings near the periphery of the flange, a disk between the working faces of said driving and driven members, said disk provided with substantially radial passages, and an annular oil conduit carried on one of said members.

2. In a clutch, the combination of a driving member, with a driven member, including a flange having oil grooves therein, said grooves leading from and returning to the periphery of said flange, a disk interposed between the working faces of said driving and driven members, said disk provided with substantially radial passages, and an annular oil conduit carried on one of said members.

3. In a clutch, the combination of a driving member, with a driven member, including a flange having oil grooves therein, said oil grooves having openings near the periphery of the flange, a trough around said flange and connected thereto, and a disk interposed between the working faces of said driving and driven members, said disk provided with substantially radial passages.

4. In a clutch, the combination of a driving member comprising a casing having a friction face therein and an oil shedding groove contiguous to said face, a plate adapted to fit within said casing and provided with a friction face and an oil shedding groove, and a driven member having a conduit near the periphery, one of said members having oil carrying grooves opening near said conduit.

5. In a clutch, the combination of driving and driven members, an oil trough carried on one of said members, and a disk interposed between the working faces of said members, said disk provided with oil passages opening adjacent to said trough.

6. In a clutch, the combination of driving and driven members, one of said members having oil grooves opening in the periphery thereof, an oil trough mounted adjacent to the periphery of one of said members, and a disk interposed between the working faces of said members, said disk provided with oil passages opening adjacent to said trough.

7. In a clutch, in combination, driving and driven members, an oil trough arranged at the periphery of the members adjacent to the working faces thereof, and means for connecting the trough to one of the members.

8. In a clutch, in combination, driving and driven members, an oil trough arranged at the periphery of the members adjacent to the working faces thereof, one of said members having oil grooves opening adjacent to the trough, and means for connecting said trough to one of the members.

9. In a clutch, a disk of suitable material provided with substantially radial slits, a part of said slits extending from the center part way toward the circumference of the disk and the other of the slits being intermediate of the first and extending from the circumference of the disk part way toward its center, substantially as described.

In testimony whereof, we have signed our names to this specification in the presence of two subscribing witnesses at Los Angeles, county of Los Angeles, State of California, this 2d day of November, A. D. 1909.

FRED E. SUTHERLAND.
JAMES A. BROWN.

Witnesses:
ALEX CURRIE,
GEO. H. DOWNS.